United States Patent [19]
Iwata

[11] Patent Number: 5,745,299
[45] Date of Patent: Apr. 28, 1998

[54] ZOOM LENS SYSTEM

[75] Inventor: Noriyuki Iwata, Kanagawa, Japan

[73] Assignee: Ricoh Company, Ltd., Tokyo, Japan

[21] Appl. No.: 538,614

[22] Filed: Oct. 3, 1995

[30] Foreign Application Priority Data

Oct. 3, 1994 [JP] Japan .................................. 6-239031

[51] Int. Cl.$^6$ ............................................ G02B 15/14
[52] U.S. Cl. .................................... 359/684; 359/689
[58] Field of Search .................................. 359/689, 684

[56] References Cited

U.S. PATENT DOCUMENTS

| | | | |
|---|---|---|---|
| 5,002,373 | 3/1991 | Yamanashi | 359/684 |
| 5,241,421 | 8/1993 | Endo et al. | 359/684 |
| 5,379,154 | 1/1995 | Shibayama et al. | 359/684 |

*Primary Examiner*—Scott J. Sugarman

*Attorney, Agent, or Firm*—Oblon, Spivak, McClelland, Maier & Neustadt, P.C.

[57] ABSTRACT

A zoom lens system which includes a first lens group, a second lens group, and a third lens group, sequentially arranged from an object side of the zoom lens system to an image side thereof, and an aperture stop which is arranged between the first lens group and the second lens group. The first lens group and the second lens group have a positive focal length. The third lens group has a negative focal length. The second lens group is used for focusing. When the zoom lens system performs a zooming operation, the first lens group, the second lens group, the third lens group, and the aperture stop are moved along an optical axis toward the object side of the zoom lens system, such that a distance between the first lens group and the aperture stop, and a distance between the aperture stop and the second lens group increase, while a distance between the second lens group and the third lens group decreases.

4 Claims, 8 Drawing Sheets

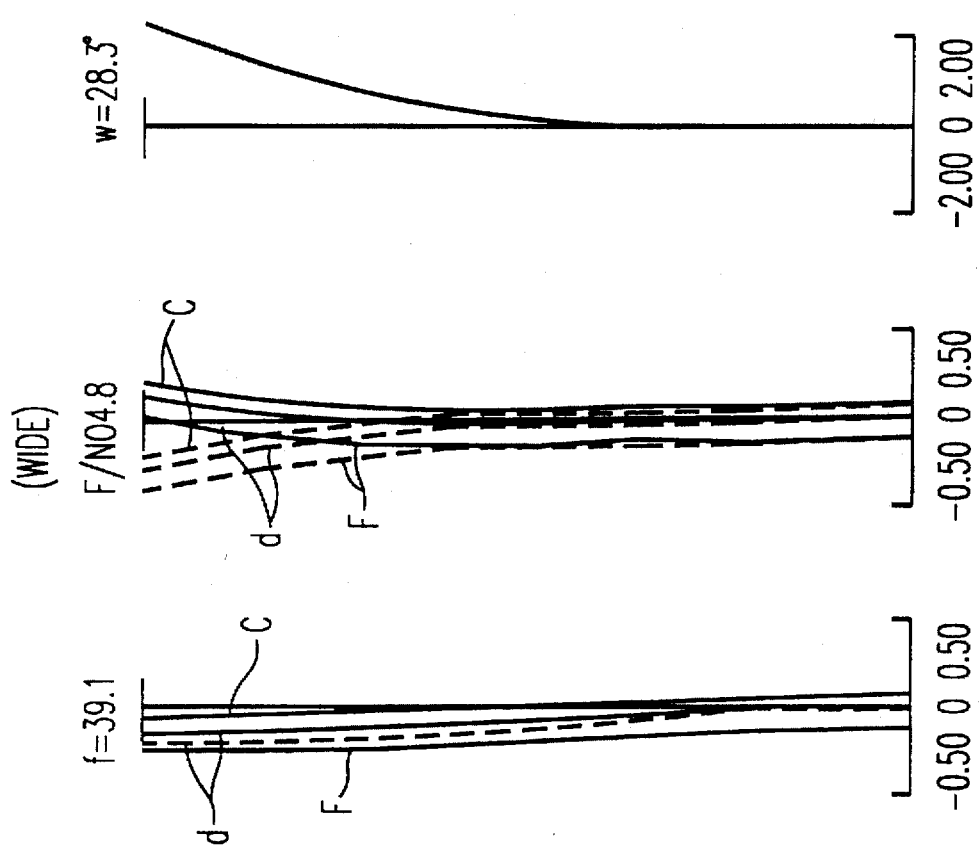

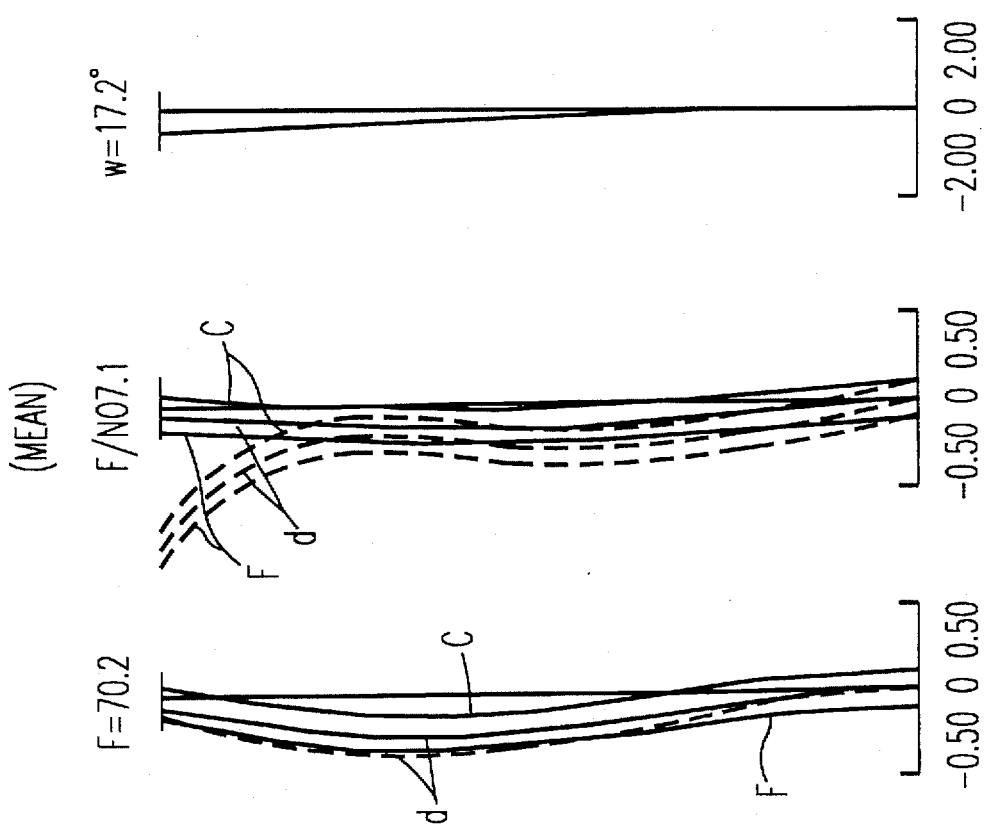

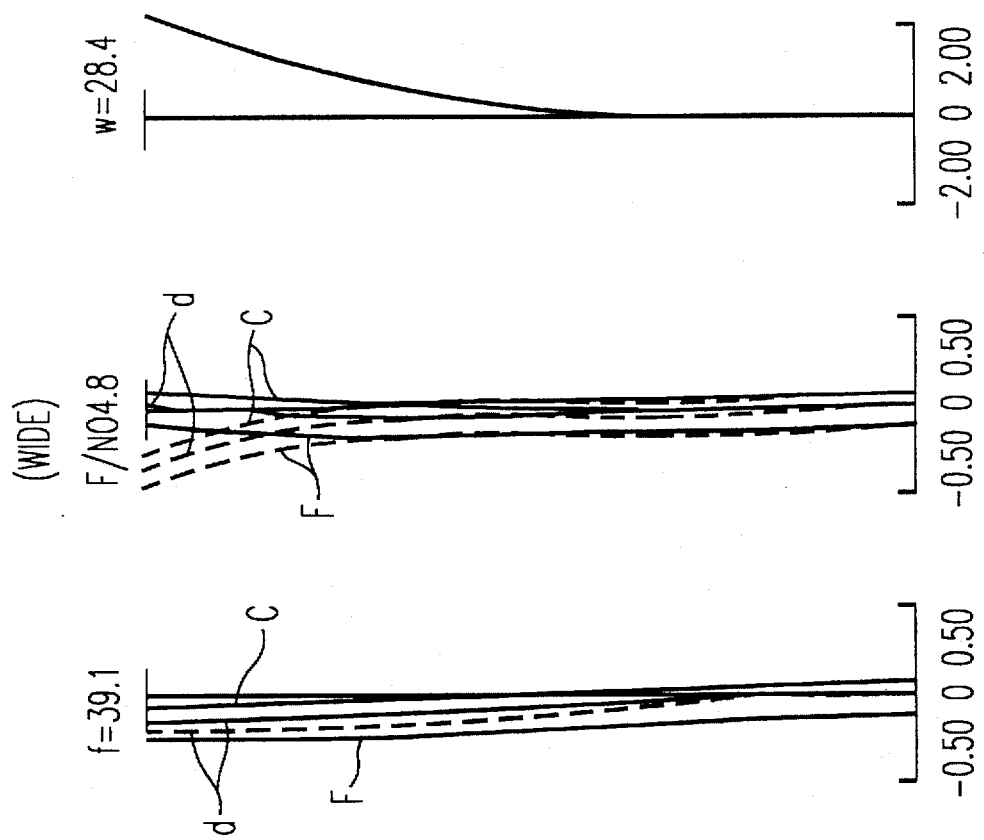

ZOOM LENS SYSTEM

BACKGROUND OF THE INVENTION

1. Field of the Invention

The present invention relates to a zoom lens system. More particularly, the present invention is directed a compact zoom lens system for varying a focal length, and which may be utilized, e.g., as a photographing lens in a lens shutter camera.

Description of the Background Art

Recently, there has been a strong demand for a popular camera designed as an integral unit, in which a camera body has a photographing lens system which can photograph at a wide or wide-angle position and a tele or telephoto position, etc., by varying a focal length of the photographing lens system. In order to satisfy this demand, it has been proposed to design the photographing lens system for the camera as a zoom lens system capable of varying a focal length thereof.

One example of a lens system of this type is disclosed in Japanese Laid-open Patent No. 5-173069 (first embodiment, FIG. 1). This zoom lens system includes a first lens group having a positive refractive power, a second lens group having a positive refractive power, and a third lens group having a negative refractive power.

However, in the above-mentioned conventional zoom lens system, a zooming ratio (corresponding to varying of the focal length of the zoom lens system) is 2.76. In addition, the diameter of second lens group is 13 mm, such that the lens body tube and the structure of the shutter mechanism are not compact. The aperture stop functions as the shutter mechanism.

SUMMARY OF THE INVENTION

Accordingly, one object of the present invention is to provide a novel zoom lens system which can solve the aforementioned drawbacks in conventional systems.

Another object of the present invention is to provide a novel zoom lens system in which a zooming ratio (variation of the focal length of the zoom lens system) is more than 3.23.

Another object of the present invention to provide a novel zoom lens system in which a diameter of the second lens group can be decreased (e.g., to 10 mm) so as to make a structure of a shutter mechanism and camera compact.

Another object of the present invention is to provide a novel zoom lens system which can minimize the number of constituent lens elements and correct aberrations well.

In order to achieve the above-mentioned objects, according to the present invention, a zoom lens system is provided which includes a master lens system and a conversion lens system in the following manner.

The zoom lens system includes a first lens group, a second lens group, and a third lens group, which are sequentially arranged from an object side of the zoom lens system to an image side thereof. The zoom lens system further includes an aperture stop which is arranged between the first lens group and the second lens group. The first lens group and the second lens group have a positive focal length. The third lens group has a negative focal length. The second lens group is used for focusing. When the zoom lens system is utilized to perform a zooming operation, the first lens group, the second lens group, the third lens group, and the aperture stop are moved along an optical axis toward the object side of the zoom lens system, such that a distance between the first lens group and the aperture stop, and a distance between the aperture stop and the second lens group increase. Further, a distance between the second lens group and the third lens group decreases.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings in which:

FIG. 2a shows an aberrational diagram of the zoom lens system showing a spherical aberration of c-line, d-line, and f-line at the first photographing distance (wide) in accordance with the first embodiment of the present invention;

FIG. 2b shows an aberrational diagram of the zoom lens system showing an astigmatism of c-line, d-line, and f-line at the first photographing distance (wide) in accordance with the first embodiment of the present invention;

FIG. 2c shows an aberrational diagram of the zoom lens system showing a distortion aberration at the first photographing distance (wide) in accordance with the first embodiment of the present invention;

FIG. 3a shows an aberrational diagram of the zoom lens system showing a spherical aberration of c-line, d-line, and f-line at the second photographing distance (mean or middle distances) in accordance with the first embodiment of the present invention;

FIG. 3b shows an aberrational diagram of the zoom lens system showing an astigmatism of c-line, d-line, and f-line at the second photographing distance (mean) in accordance with the first embodiment of the present invention;

FIG. 3c shows an aberrational diagram of the zoom lens system showing a distortion aberration at the second photographing distance (mean) in accordance with the first embodiment of the present invention;

FIG. 5a shows an aberrational diagram of the zoom lens system showing a spherical aberration of c-line, d-line, and f-line at the first photographing distance (wide) in accordance with the second embodiment of the present invention;

FIG. 5b shows an aberrational diagram of the zoom lens system showing an astigmatism of c-line, d-line, and f-line at the first photographing distance (wide) in accordance with the second embodiment of the present invention;

FIG. 5c shows an aberrational diagram of the zoom lens system showing a distortion aberration at the first photographing distance (wide) in accordance with the second embodiment of the present invention;

DESCRIPTION OF THE PREFERRED EMBODIMENTS

Figure 1:
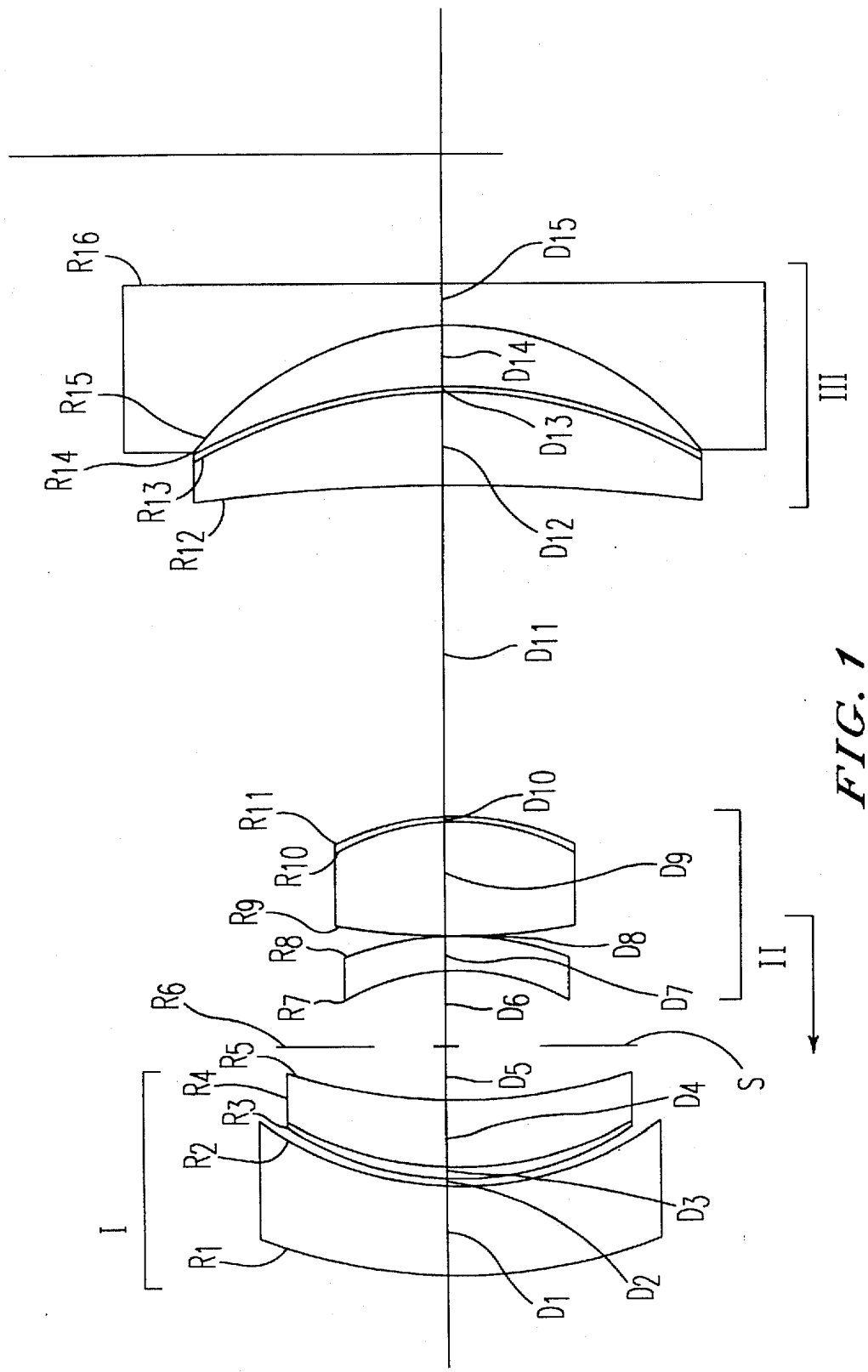
FIG. 1 shows a sectional view illustrating a composition of a zoom lens system in accordance with first and second embodiments of the present invention.

Preferred embodiments of a zoom lens system in accordance with the present invention will now be explained with reference to the accompanying drawings. Referring to FIG. 1, the zoom lens system of the present invention includes a lens system, and an aperture stop s.

The zoom lens system has a first lens group I, a second lens group II, and a third lens group III, which are sequentially arranged from an object side of the zoom lens system to an image surface side thereof, and an aperture stops which is arranged between the first lens group I and the second lens group II. The first lens group I and the second lens group II have a positive focal length, while the third lens group III has a negative focal length.

Figure 8B:
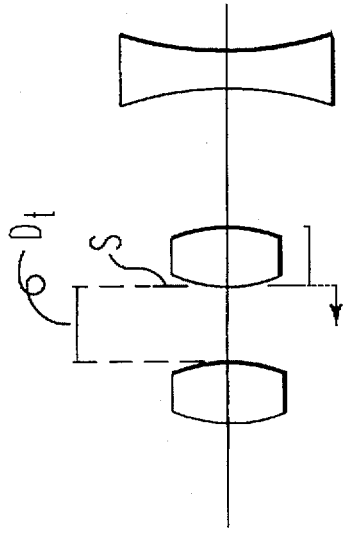
FIG. 8b and 8d show an optical arrangement of first, second, and third lens groups of a conventional zoom lens system at a wide-position, and a tele-position, respectively.
Figure 8D:
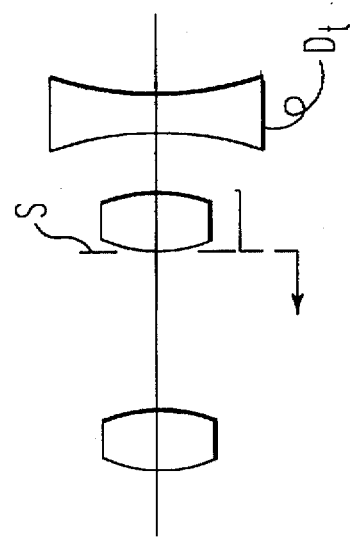
Figure 8A:
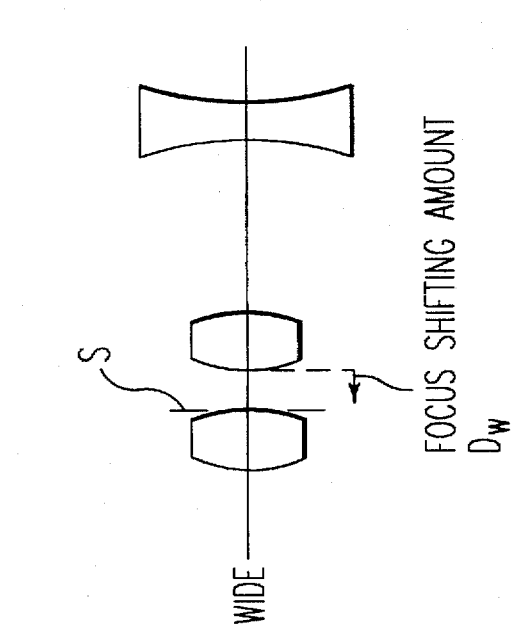
FIG. 8a and 8c show an optical arrangement of first, second, and third lens groups of a zoom lens system at a wide-position or wide-angle position, and a tele-position or telephoto position, respectively, in accordance with first and second embodiments of the present invention.
Figure 8C:
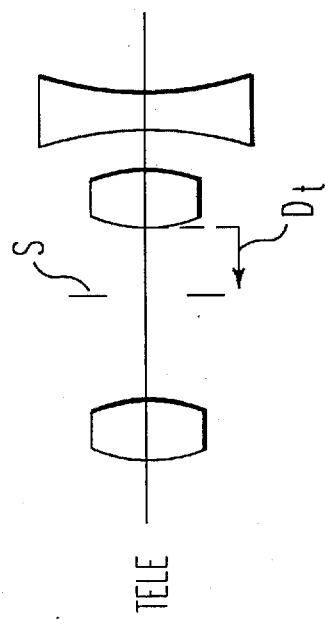

FIG. 8a depicts an optical arrangement of the first, second, and third lens groups of a zoom lens system at a wide-position or wide-angle position, and at a tele-position or telephoto position in accordance with first and second embodiments of the present invention. FIG. 8b shows an optical arrangement of first, second, and third lens groups of a conventional zoom lens system at a wide-position, and a tele-position. Referring to FIGS. 8a and 8b, when the second lens group is used for focusing upon an object, the second lens group is moved on an optical axis of the zoom lens system toward the object side.

In the present invention, a focus shifting amount of the second lens group at a tele-position is larger than that at the wide-position. The focus shifting amount at the tele-position is provided between the aperture stop and the second lens group due to the lens tube mechanical structure. Thus, a distance Dt between the aperture stop and the second lens group at a tele-position is larger than a distance Dw between the aperture stop and the second lens group at a wide-position.

In the conventional zoom lens system, a distance between an aperture stop and a second lens group is constant. The focus shifting amount at the tele-position is therefore required to be between the aperture stop and the first lens group due to the lens tube mechanical structure.

In the zoom lens system of the present invention, a distance between the first lens group and the second lens group at the wide-position is smaller than that of the conventional zoom lens system. Therefore, the first lens group can be located nearer to the second lens group at the wide-position so as to increase a zooming ratio (e.g., to 3.23 or greater).

With the present invention, the optical arrangement of the first, and second lens groups of the zoom lens system at the wide-position is the same as that at a storing-position. In the storing-position, a distance between the first lens group and the aperture stop, and a distance between the aperture stop and the second lens group are minimized so as to decrease a diameter of lens body tube of the zoom lens system, and thereby provide a compact structure of a shutter mechanism and camera.

A distance Dw between the aperture stop and the second lens group at a wide-position, and a distance Dt between the aperture stop and the second lens group at a tele-position satisfy the following relationship:

$$1.1 < Dt/Dw < 1.4.$$

If the upper limit of the ratio is exceeded, the distance Dt between the aperture stop and the second lens group at a tele-position increases, and a diameter of the aperture stop increases, resulting in an increase of the size for the structure of the shutter mechanism and the diameter of the lens body tube.

A convex surface, in lens elements of the first lens group, the second lens group, and the third lens group, has an aspherical surface made of a thin acrylic resin layer. Further, in the preferred embodiment, the number of constituent lens elements of each of the first lens group, the second lens group, and the third lens group is two, and the number of total constituent lens elements of the zoom lens system is six, and the arrangement provides a zoom lens system which can correct aberrations well.

Numerical values of parameters of the above constituent elements of the zoom lens systems of the present invention shown in FIG. 1 will now be discussed as illustrative examples.

With respect to the zoom lens system of the arrangement of FIG. 1, Ri (i=1 to 16) designates a radius of curvature of an i-th lens surface including an aperture stop face, as counted from the object side of the zoom lens system; Di (i=1 to 15) designates a distance between the i-th lens surface and an (i+1)-th lens surface on the optical axis of the zoom lens system, as counted from the object side of the zoom lens system; Nj (j=1 to 9) designates a refractive index of a material of a j-th lens, as counted from the object side of the zoom lens system; and vj (j=1 to 9) designates an Abbe's number of this j-th lens, as counted from the object side of the zoom lens system. Further, reference numeral f designates a focal length of the zoom lens system. Reference numeral F/No designates a brightness of the zoom lens system. In the following description, an X-coordinate is set to be in conformity (or to extend along) with the optical axis of the lens system, while an H-coordinate is set to be perpendicular to the optical axis of the lens system.

Reference numeral c designates the curvature ratio on the optical axis (c=1/(a radius of curvature of an aspherical surface on the optical axis)). Reference numeral K designates a conical constant. Reference numeral A, B, C, and D designate aspherical coefficients of higher orders. In this case, as is well known, the aspherical surface is provided by a curved surface obtained by rotating a curve represented by the following formula around the optical axis of the lens system.

$$X = CH^2/(1 + \sqrt{[1-(1+k)c^2H^2]}) + AH^4 + BH^6 + CH^8 + DH^{10}$$

A shape of the aspherical surface is specified by providing the radius of curvature on the optical axis of the lens system, the conical constant, and the aspherical coefficients of higher orders.

With respect to the aspherical coefficients, E (Exponent) and a number subsequent to E designate a power. For example, E-9 designates $1/10^9$ and this value $1/10^9$ is multiplied by the numerical value indicated before the E.

With the foregoing symbols and relationships thus described, first and second embodiments of the present invention will now be described.

First Embodiment

Numerical values utilizing the above-mentioned parameters of the zoom lens system shown in FIG. 1 are set out in the following Table 1. As noted above, FIG. 1 is a sectional view illustrating a composition of a zoom lens system in accordance with a first embodiment of the present invention, by way of example, as follows:

TABLE 1

| f = 39.1 ~ 126.1 | F/No = 4.8 ~ 10.6 | | | | |
|---|---|---|---|---|---|
| i | $R_i$ | $D_i$ | j | $N_j$ | $v_j$ |
| 1 | 22.025 | 3.7 | 1 | 1.84666 | 23.83 |
| 2 | 15.153 | 0.328 | | | |
| 3 | 12.942 | 0.44 | 2 | 1.52725 | 42.32 |
| 4 | 14.406 | 2.736 | 3 | 1.54814 | 45.82 |
| 5 | 24.7 | variable | | | |
| 6 | ∞ (aperture stop) | variable | | | |
| 7 | −9.09 | 1.4 | 4 | 1.7995 | 42.34 |
| 8 | −13.217 | 0.1 | | | |
| 9 | 49.334 | 4.608 | 5 | 1.48749 | 70.44 |
| 10 | −9.538 | 0.2 | 6 | 1.52725 | 42.32 |
| 11 | −11.054 | variable | | | |
| 12 | −73.113 | 3.692 | 7 | 1.68893 | 31.16 |
| 13 | −22.331 | 0.2 | 8 | 1.52725 | 42.32 |
| 14 | −38.186 | 2.689 | | | |
| 15 | −13.701 | 1.6 | 9 | 1.6968 | 55.46 |
| 16 | 532.222 | | | | |

| variable amounts | | | |
|---|---|---|---|
| | WIDE | MEAN | TELE |
| f | 39.1 | 70.2 | 126.1 |
| $D_5$ | 2.0558 | 13.3436 | 22.0182 |
| $D_6$ | 3.1433 | 3.3433 | 4.1433 |
| $D_{11}$ | 13.7935 | 6.0523 | 1.1607 | aspherical surface
3rd surface
K = −0.14332, A = 4.02717E-7,
B = −1.48846E-7, C = 2.6298E-9,
D = −1.92158E-11
11th surface
K = −0.41752, A = 4.64294E-5,
B = 5.27129E-7, C = −2.09743E-8

TABLE 1-continued

D = 2.97115E-10
14th surface
K = 8.76917, A = −5.67625E-5,
B = 2.42259E-7, C = −2.64852E-9
D = 1.00096E-11
condition
$D_T/D_W = 1.32$ FIG. 2a shows an aberrational diagram of the zoom lens system showing a spherical aberration of the c-line, d-line, and f-line at the first photographing distance (wide) in accordance with the first embodiment of the present invention. FIG. 2b shows an aberrational diagram of the zoom lens system showing an astigmatism of the c-line, d-line, and f-line at the first photographing distance (wide) in accordance with the first embodiment of the present invention. FIG. 2c shows an aberrational diagram of the zoom lens system showing a distortion aberration at the first photographing distance (wide) in accordance with the first embodiment of the present invention.

FIG. 3a shows an aberrational diagram of the zoom lens system showing a spherical aberration of the c-line, d-line, and f-line at the second photographing distance (mean or middle distance) in accordance with the first embodiment of the present invention. FIG. 3b shows an aberrational diagram of the zoom lens system showing an astigmatism of the c-line, d-line, and f-line at the second photographing distance (mean) in accordance with the first embodiment of the present invention. FIG. 3c shows an aberrational diagram of the zoom lens system showing a distortion aberration at the second photographing distance (mean) in accordance with the first embodiment of the present invention.

Figures 4A, 4B, 4C:
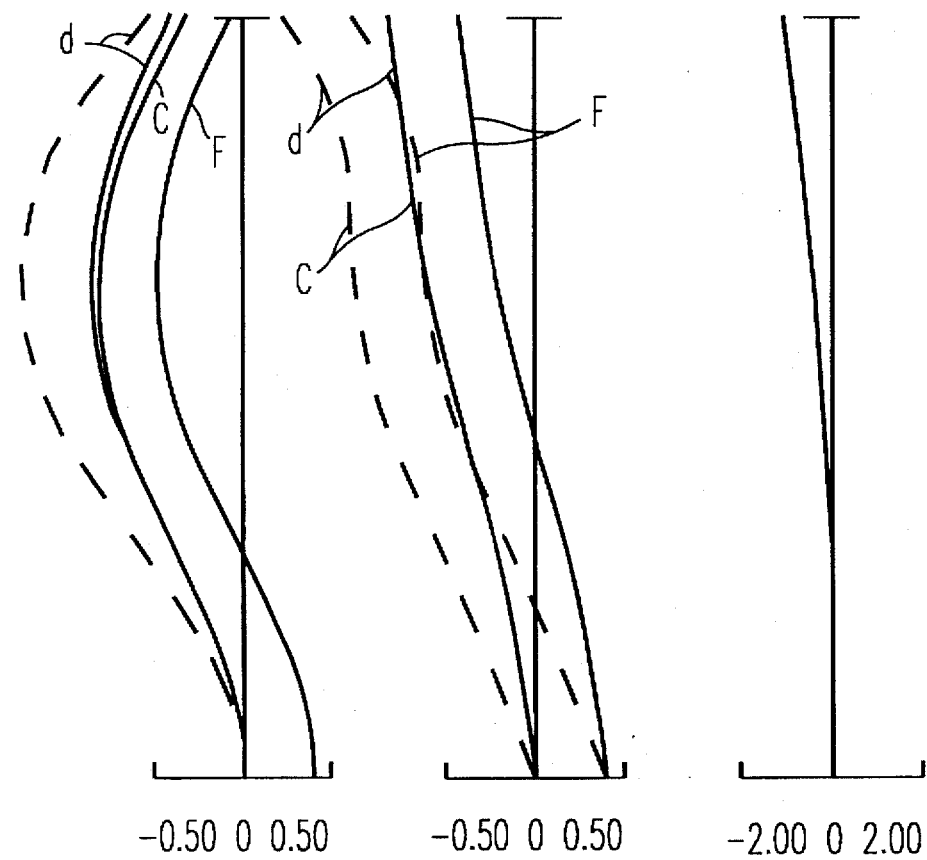
FIG. 4a shows an aberrational diagram of the zoom lens system showing a spherical aberration of c-line, d-line, and f-line at the third photographing distance (tele) in accordance with the first embodiment of the present invention.
FIG. 4b shows an aberrational diagram of the zoom lens system showing an astigmatism of c-line, d-line, and f-line at the third photographing distance (tele) in accordance with the first embodiment of the present invention.
FIG. 4c shows an aberrational diagram of the zoom lens system showing a distortion aberration at the third photographing distance (tele) in accordance with the first embodiment of the present invention.

FIG. 4a shows an aberrational diagram of the zoom lens system showing a spherical aberration of the c-line, d-line, and f-line at the third photographing distance (tele) in accordance with the first embodiment of the present invention. FIG. 4b shows an aberrational diagram of the zoom lens system showing an astigmatism of the c-line, d-line, and f-line at the third photographing distance (tele) in accordance with the first embodiment of the present invention. FIG. 4c shows an aberrational diagram of the zoom lens system showing a distortion aberration at the third photographing distance (tele) in accordance with the first embodiment of the present invention.

The above aberrations are preferably corrected to provide the preferred performance of the lens system.

Second Embodiment

Numerical values of the previously discussed parameters of the zoom lens system shown in FIG. 1, for a second embodiment, are provided in the following Table 2. As noted above, FIG. 1 is a sectional view illustrating a composition of a zoom lens system, and a second embodiment of the present invention can be provided, by way of example, as follows:

TABLE 2

| f = 39.1 ~ 126.2 | F/No = 4.8 ~ 10.6 | | | | |
|---|---|---|---|---|---|
| i | $R_i$ | $D_i$ | j | $N_j$ | $v_j$ |
| 1 | 22.891 | 3.7 | 1 | 1.84666 | 23.78 |
| 2 | 15.8531 | 0.23 | | | |
| 3 | 12.934 | 0.43 | 2 | 1.52725 | 42.32 |

TABLE 2-continued

| | | | | | |
|---|---|---|---|---|---|
| 4 | 14.2983 | 2.76 | 3 | 1.54814 | 45.82 |
| 5 | 23.455 | variable | | | |
| 6 | ∞ (aperture stop) | variable | | | |
| 7 | −9.23 | 1.4 | 4 | 1.7995 | 42.34 |
| 8 | −13.4092 | 0.1 | | | |
| 9 | 45.46 | 4.63 | 5 | 1.48749 | 70.44 |
| 10 | −9.7289 | 0.2 | 6 | 1.52725 | 42.32 |
| 11 | −11.224 | variable | | | |
| 12 | −59.749 | 3.71 | 7 | 1.68893 | 31.16 |
| 13 | −21.199 | 0.2 | 8 | 1.52725 | 42.32 |
| 14 | −33.677 | 2.43 | | | |
| 15 | −13.8729 | 1.6 | 9 | 1.6968 | 55.46 |
| 16 | 480.505 | | | | |

| variable amounts | | | |
|---|---|---|---|
| | WIDE | MEAN | TELE |
| f | 39.1 | 70.3 | 126.2 |
| $D_5$ | 2.1422 | 13.401 | 22.85 |
| $D_6$ | 3.1245 | 3.324 | 3.724 |
| $D_{11}$ | 13.9984 | 6.21 | 1.322 | aspherical surface
3rd surface
K = −0.2259, A = 2.969E-6,
B = −1.1515E-7, C = 2.2574E-9,
D = −1.5781E-11
11th surface
K = −0.44556, A = 4.7693E-5,
B = 3.4569E-7, C = −1.5102E-8
D = 2.3029E-10
14th surface
K = 6.1858, A = −5.4976E-51
B = 2.3559E-7, C = −2.2466E-9
D = 8.1111E-12
condition
$D_T/D_W = 1.19$ FIG. 5a shows an aberrational diagram of the zoom lens system showing a spherical aberration of the c-line, d-line, and f-line at the first photographing distance (wide) in accordance with the second embodiment of the present invention. FIG. 5b shows an aberrational diagram of the zoom lens system showing an astigmatism of the c-line, d-line, and f-line at the first photographing distance (wide) in accordance with the second embodiment of the present invention. FIG. 5c shows an aberrational diagram of the zoom lens system showing a distortion aberration at the first photographing distance (wide) in accordance with the second embodiment of the present invention.

Figure 6A:
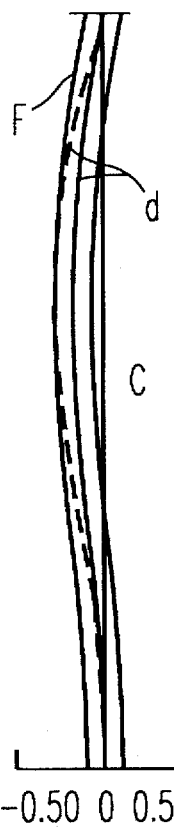
FIG. 6a shows an aberrational diagram of the zoom lens system showing a spherical aberration of c-line, d-line, and f-line at the second photographing distance (mean) in accordance with the second embodiment of the present invention.
Figure 6B:
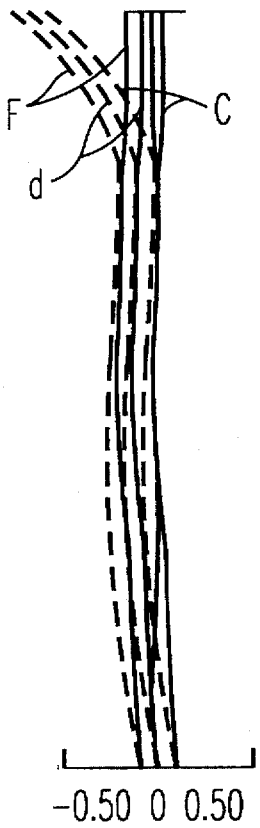
FIG. 6b shows an aberrational diagram of the zoom lens system showing an astigmatism of c-line, d-line, and f-line at the second photographing distance (mean) in accordance with the second embodiment of the present invention.
Figure 6C:
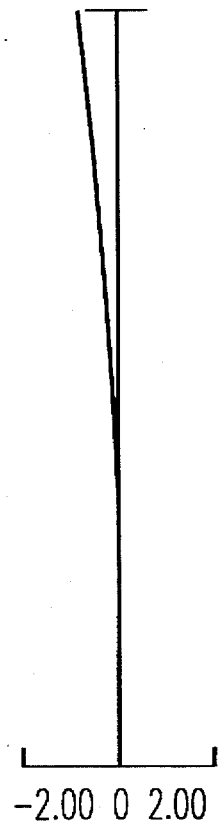
FIG. 6c shows an aberrational diagram of the zoom lens system showing a distortion aberration at the second photographing distance (mean) in accordance with the second embodiment of the present invention.

FIG. 6a shows an aberrational diagram of the zoom lens system showing a spherical aberration of the c-line, d-line, and f-line at the second photographing distance (mean) in accordance with the second embodiment of the present invention. FIG. 6b shows an aberrational diagram of the zoom lens system showing an astigmatism of the c-line, d-line, and f-line at the second photographing distance (mean) in accordance with the second embodiment of the present invention. FIG. 6c shows an aberrational diagram of the zoom lens system showing a distortion aberration at the second photographing distance (mean) in accordance with the second embodiment of the present invention.

Figures 7A, 7B, 7C:
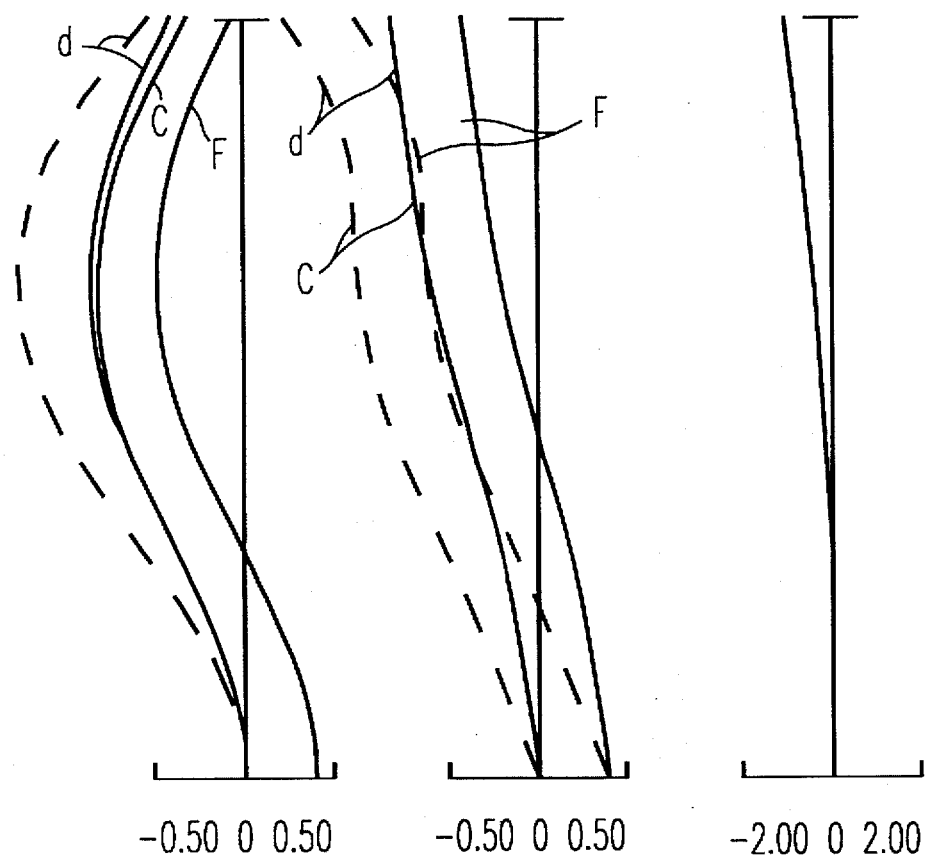
FIG. 7a shows an aberrational diagram of the zoom lens system showing a spherical aberration of c-line, d-line, and f-line at the third photographing distance (tele) in accordance with the second embodiment of the present invention.
FIG. 7b shows an aberrational diagram of the zoom lens system showing an astigmatism of c-line, d-line, and f-line at the third photographing distance (tele) in accordance with the second embodiment of the present invention.
FIG. 7c shows an aberrational diagram of the zoom lens system showing a distortion aberration at the third photographing distance (tele) in accordance with the second embodiment of the present invention.

FIG. 7a shows an aberrational diagram of the zoom lens system showing a spherical aberration of the c-line, d-line, and f-line at the third photographing distance (tele) in accordance with the second embodiment of the present invention. FIG. 7b shows an aberrational diagram of the zoom lens system showing an astigmatism of the c-line, d-line, and f-line at the third photographing distance (tele) in accordance with the second embodiment of the present invention. FIG. 7c shows an aberrational diagram of the zoom lens system showing a distortion aberration at the third photographing distance (tele) in accordance with the second embodiment of the present invention.

The above aberrations are preferably corrected to provide the preferred performance of the lens system.

Obviously numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A zoom lens system comprising:

a first lens group, a second lens group, and a third lens group, which are sequentially arranged from an object side of the zoom lens system to an image side;

an aperture stop disposed between said first lens group and said second lens; group;

wherein said first lens group and said second lens group have a positive focal length, said third lens group has a negative focal length, and wherein said second lens group is utilized for focusing; and wherein said aperture stop and said first, second and third lens groups are disposed such that when said zoom lens system performs a zooming operation from a wide-position to a tele-position, said first lens group, said second lens group, said third lens group, and said aperture stop are moved along an optical axis toward said object side of said zoom lens system so that a distance between said first lens group and said aperture stop increases, and so that a distance between said aperture stop and said second lens group increases, and a distance between said second lens group and said third lens group decreases.

2. A zoom lens system according to claim 1, wherein a distance Dw between said aperture stop and said second lens group at the wide-position, and a distance Dt between said aperture stop and said second lens group at the tele-position satisfy the following relationship:

1.1<Dt/Dw<1.4.

3. A lens system according to claim 1, wherein:

said first lens group, said second lens group, and said third lens group each include two lens elements, and at least one convex surface of lens elements of said first lens group, said second lens group, and said third lens group has an aspherical surface made of a thin resin layer.

4. A zoom lens system as recited in claim 1, wherein said first lens group is adjacent to said aperture stop and said second lens group is adjacent to said aperture stop, such that a lens group is not disposed between said first lens group and said second lens group.

* * * * *